(12) United States Patent
Haas et al.

(10) Patent No.: US 12,044,378 B1
(45) Date of Patent: Jul. 23, 2024

(54) METHOD FOR OPERATION-OPTIMIZED CONTROL OF A DEFLECTION UNIT

(71) Applicant: ZKW Group GmbH, Wieselburg (AT)

(72) Inventors: Erik Haas, Rabenstein an der Pielach (AT); Clemens Aigner, St. Pölten (AT); Stefan Miedler, Unterradlberg (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/397,583

(22) Filed: Dec. 27, 2023

(30) Foreign Application Priority Data

Dec. 28, 2022 (EP) .................................... 22216977

(51) Int. Cl.
*F21S 41/153* (2018.01)
*F21S 41/63* (2018.01)
*F21Y 115/10* (2016.01)

(52) U.S. Cl.
CPC ........... *F21S 41/635* (2018.01); *F21S 41/153* (2018.01); *F21Y 2115/10* (2016.08)

(58) Field of Classification Search
CPC .... F21S 41/635; F21S 41/153; F21Y 2115/10
See application file for complete search history.

(56) References Cited

U.S. PATENT DOCUMENTS

| | | | | |
|---|---|---|---|---|
| 2008/0218835 A1* | 9/2008 | Sandner | ............. | H04N 1/40037 348/E9.026 |
| 2013/0058114 A1* | 3/2013 | Reiners | ................. | F21S 41/675 362/510 |
| 2014/0293247 A1 | 10/2014 | Abe et al. | | |
| 2016/0091773 A1 | 3/2016 | Mizoguchi et al. | | |
| 2016/0146419 A1* | 5/2016 | Reinprecht | ............. | F21S 41/67 362/512 |
| 2016/0334631 A1* | 11/2016 | Schmid | .............. | G02B 19/0014 |

(Continued)

FOREIGN PATENT DOCUMENTS

JP 2019053128 A 4/2019

OTHER PUBLICATIONS

Extended European Search Report for European Patent Application No. 22216977.3 dated Jun. 20, 2023 (9 Pages).

*Primary Examiner* — Evan P Dzierzynski
(74) *Attorney, Agent, or Firm* — Eversheds Sutherland (US) LLP (57) ABSTRACT

Method for operation-optimized control of a deflection unit (DU) for a light module. The light module is designed to emit segmented light distribution. The light module includes the DU, with which a native resolution of the light module can be visually increased by at least temporary beam deflection via the DU. The method includes: a) receiving a setpoint operating signal (SOS) which contains information on at least one of: setpoint's energy efficiency, temperature, image resolution, image sharpness, clarity, or offset correction; and b) manipulating a control variable (CV) of the DU depending on the SOS, wherein the extent and temporal process of deflection by the DU occurs depending on the CV. At least two of the following aspects of the deflection, predetermined by the CV, are manipulated in amount and/or time period: amplitude; zero position; temporal rate of change; signal basic form; or time period between the zero position passes.

16 Claims, 5 Drawing Sheets

(56) References Cited

U.S. PATENT DOCUMENTS

2018/0095269 A1    4/2018  Mizoguchi et al.
2018/0142842 A1*   5/2018  Schwaiger ............... F21V 7/04
2022/0400238 A1    12/2022 Kim

* cited by examiner

METHOD FOR OPERATION-OPTIMIZED CONTROL OF A DEFLECTION UNIT

CROSS-REFERENCE TO RELATED APPLICATIONS

This application claims priority to European Patent Application No. 22216977.3, filed Dec. 28, 2022, which is incorporated herein by reference.

FIELD OF THE INVENTION AND DESCRIPTION OF PRIOR ART

The invention relates to a method for operation-optimized control of a deflection unit for a light module, wherein the light module is designed to emit segmented light distribution.

Methods for controlling motor vehicle light modules have become known from the prior art, which enable a time-variable change in the light emission of individual segments of light distribution.

SUMMARY OF THE INVENTION

In order to improve the light emission, the components of the light module in question have so far been modified, for example by using components that enable better resolution, improved contrast, increased light intensities, increased efficiency and so on.

One object of the invention is to provide a method which can optimize the operation of a light module. This object is achieved in a first aspect by virtue of the fact that it has been recognized that a function-dependent variable control of the deflection unit offers the possibility of optimizing the operation of the light module, and in a second aspect, this object is subsequently achieved by providing certain technical features and method steps, namely, by virtue of the fact that the light module comprises the deflection unit, with which a native resolution of the light module can be visually increased by at least temporary beam deflection by means of the deflection unit, wherein the method comprises the following steps:

a) receiving a setpoint operating signal, wherein the setpoint operating signal contains information on at least one of the following criteria: setpoint energy efficiency; setpoint temperature; setpoint image resolution; setpoint image sharpness; setpoint clarity; offset correction;

b) manipulating a control variable of the deflection unit depending on the setpoint operating signal, wherein the extent and temporal process of the deflection by the deflection unit occurs depending on the control variable, wherein for this purpose at least two of the following aspects of the deflection, predetermined by the control variable, are manipulated in amount and/or time period: amplitude; zero position; temporal rate of change; signal basic form; time period between the zero position passes.

The deflection unit can be continuously illuminated as a function of the desired light intensity or also illuminated at specific intervals or for predetermined periods of time, for example only when the deflection unit has assumed a desired position.

The expression "native resolution" is understood to mean any resolution that is achieved by the sum of the individually controllable segments for light emission. If, for example, the segments are arranged in two rows and two columns and are individually controllable, this corresponds to a native resolution of 2×2, wherein each individually controllable segment can also be referred to as a light pixel. The motor vehicle light module preferably has a native resolution of at least 2×2; it is particularly preferably a high-resolution motor vehicle light module.

The resolution that is perceived by the human eye can be increased compared to the native resolution by the at least temporary beam deflection by means of the deflection unit.

In particular, it can be provided that in order to achieve a setpoint energy efficiency derived from the setpoint operating signal according to step a), the time period between the zero passes is manipulated in such a way that in any case where an actual energy efficiency of the deflection unit falls below the setpoint energy efficiency, the time period between the zero position passes is increased. The higher the frequency with which the deflection unit is controlled, the higher the energy consumption and the lower the energy efficiency. Reducing the frequency makes it possible to operate the lighting device more economically, which again helps save energy and increase the service life of the actuator and the deflection device provided for it.

In particular, it can be provided that the motor vehicle light module is designed to emit light images that are different from one another with a frequency of at least 60 Hz, typically between 60 Hz and 160 Hz such that different setpoint images with a frequency of at least 30 Hz are received and converted into individual low-resolution images of the respective image pair with a frequency of at least 60 Hz and emitted one after the other by the motor vehicle light module. The deflection unit can therefore be controlled with a frequency of at least 60 Hz or the deflection unit is designed to assume a desired deflection position within a maximum of $\frac{1}{60}$ of a second starting from any starting position.

It can further be provided that the setpoint energy efficiency is predetermined in such a way that it is determined as a function of a detected driving speed of a vehicle comprising the light module together with the deflection unit such that the required setpoint energy efficiency increases as the driving speed decreases.

For example, as a function of the speed sensor of the car or light image. For example, the frequency can be set lower for a welcome projection in stationary mode than in travelling mode, as this can lead to unwanted stroboscopic effects.

The deflection unit can be permanently illuminated. Alternatively, however, it can also be provided that the deflection unit is only illuminated within certain time intervals, e.g. clocked and/or only at times when the deflection unit reaches at least 90% of certain position ranges, e.g. amplitude. In particular in the case of a ground projection or welcome projection, it can be provided that the light is emitted in a timed manner. Visual special effects can also be achieved with a timed light source.

In particular, it can be provided that in order to achieve a setpoint temperature derived from the setpoint operating signal according to step a), the time period between the zero passes is manipulated in such a way that in any case where an actual temperature of the deflection unit or of the light module exceeds a setpoint temperature, the time period between the zero position passes is increased.

It can further be provided that in order to achieve a setpoint image sharpness derived from the setpoint operating signal according to step a), the amplitude of the deflection is manipulated in such a way that a maximum amplitude is predetermined when maximum image sharpness is predetermined, and the amplitude is reduced as the setpoint image sharpness decreases.

For example, in the case of dipped beam distribution, it can be advantageous for the light distribution to exhibit blurring. For this purpose, the deflection angle of the deflection unit can be reduced. Blurring can also be advantageous for transitions from standard light distribution to another distribution.

In particular, it can be provided that in order to achieve a setpoint image resolution derived from the setpoint operating signal according to step a), the amplitude of the deflection is manipulated in such a way that a maximum amplitude is predetermined when maximum setpoint image resolution is predetermined, and the amplitude is reduced as the setpoint image resolution decreases.

It can further be provided that the light distribution is segmented by individually controllable light pixels, which are arranged next to each other in a matrix with a native resolution of at least two rows and two columns, substantially without gaps, wherein the maximum amplitude of the deflection is selected such that compared to a non-deflected reference state, the deflected state has a vertical and a horizontal offset of half a pixel width such that when the maximum amplitude of the deflection is reached—with the exception of edge pixels—each deflected light pixel spatially overlaps four non-deflected light pixels by 25% each. The perceived resolution can thus be four times the native resolution. An edge pixel is understood as a light pixel that is not surrounded on all sides by further light pixels, but is free of adjacent light pixels at least on its side. It thus constitutes an edge region of the image to be emitted.

In particular, it can be provided that the deflection unit has a neutral position, which the deflection unit automatically assumes in the event of a failure of a power supply to the deflection unit or of a control variable provided for controlling the deflection unit. A neutral position is understood as any position of the deflection unit in which no electrical voltage is applied to the deflection unit. This position can, but does not have to, differ from a zero position in which the deflection unit does not cause any substantial deflection of the light passing through the deflection unit. In the event that the actuator is not required or has to be switched off, this ensures that the light function continues to be output.

It can further be provided that in order to achieve a setpoint energy efficiency derived from the setpoint operating signal according to step a), the amplitude of the deflection is manipulated in such a way that in any case where an actual energy efficiency of the deflection unit falls below the setpoint energy efficiency, the amplitude of the deflection is reduced. In addition, the service life of the actuator can also be increased if needed thanks to the lower deflection.

In particular, it can be provided that in order to achieve an offset correction derived from the setpoint operating signal according to step a), the zero position of the deflection is manipulated.

Manufacturing and component tolerances may result in slight deviations in the intended light path. In order to optimize this as far as possible regardless thereof, an offset correction can, for example, be carried out, i.e. the intended deflection angles are adjusted in such a way that the effects of the optimal deflection angle and the neutral position are still achieved.

It can further be provided that in order to achieve a setpoint image sharpness derived from the setpoint operating signal according to step a), the temporal rate of change of the deflection is manipulated in such a way that in any case where an actual image sharpness of the deflection unit falls below the setpoint image sharpness, the temporal rate of change of the deflection is increased. This does not necessarily mean an increase in frequency, but can also be achieved by virtue of the fact that the edges connecting two end positions together are steeper and the end positions can therefore be held longer in time while the duration of the overall work cycle remains the same. The faster the actuator movement or change in position of the deflecting element of the deflection unit is carried out, the sharper the image becomes; the slower the movement, the more the transitions between the first frame and the second frame are "mixed" together.

For example, in the case of dipped beam distribution, it can be advantageous that the light distribution exhibits blurring, i.e. blending between the visually perceptible light of adjacent pixels. If this is necessary, the deflection angle can be reduced. Blurring can also be advantageous for transitions from standard light distribution to another distribution.

In particular, it can be provided that in order to achieve a setpoint clarity of the deflection unit derived from the setpoint operating signal according to step a), the temporal rate of change of the deflection is manipulated in such a way that if a setpoint clarity is undershot, the temporal rate of change of the deflection is at least temporarily increased. Contaminating particles are detached from the deflection unit by the increased mechanical movement within the deflection unit.

The light module is preferably designed for use in a motor vehicle light, in particular a signalling light or a motor vehicle headlight. Accordingly, the light module can also be part of the aforementioned devices.

It should be mentioned at this point that the individual functions or optimization tasks mentioned can also be weighted or hierarchically structured. If, for example, the function of the deflection unit is jeopardized by excessive temperatures being reached, the temperature requirements could be weighted higher than requirements stipulated as a function of the driving speed. The highest weighting can be given to all safety-related requirements. When, for example, the setpoint temperature is to be reduced (e.g. by lowering the deflection frequency or decreasing the amplitude) and at the same time dust/dirt over a permissible threshold is detected (which could be combated by increasing the deflection frequency). In this case, the requirement for the setpoint temperature is weighted higher as an excessive temperature can lead to an irreparable defect in the deflection unit.

The information of the setpoint image can also contain information about the setpoint light intensity of the individual pixels of the image. This information can be passed on to the light source of the motor vehicle light module and implemented by it.

It can further be provided that the deflection unit comprises a glass plate, which is pivotable or displaceable about at least one, preferably exactly one axis or exactly two axes.

In particular, it can be provided that the glass plate has a flat light entry surface and a light-emitting surface plane-parallel thereto, wherein the deflection unit has at least one electrical coil for each axis about which the glass plate can be pivoted, wherein a means for magnetic coupling to the respective coil is arranged on the glass plate for each coil such that a force can be exerted on the associated means by energizing the respective coil in such a way that the glass plate is pivoted about the respective axis as a function of the energizing of the coil. The glass plate is arranged in the beam path of the light module. The light is deflected by refraction as it enters and exits the glass plate.

It can further be provided that for each axis about which the glass plate can be pivoted, the deflection unit also has a mechanical restoring element, in particular a spring element, for restoring the glass plate to a neutral position, which the glass plate automatically assumes in the event of a failure of a power supply to the deflection unit or of a control variable provided for controlling the deflection unit. Of course, two or more restoring elements can also be provided per axis.

The invention further relates to a light module for a motor vehicle light, wherein the light module is designed to emit segmented light distribution, wherein the light module comprises a deflection unit, with which a native resolution of the light module can be visually increased by at least temporary beam deflection by means of the deflection unit, wherein the light module is designed to implement the method according to the invention.

All device features named in the method can also form part of the light module, unless stated otherwise. Conversely, all device features named in conjunction with the light module can also form part of the aforementioned method. The light module can relate both to a signalling light and a motor vehicle headlight. The light module is preferably designed for use in a motor vehicle light, in particular in a signalling light or in a motor vehicle headlight. Accordingly, the light module can also be part of the aforementioned devices.

BRIEF DESCRIPTION OF THE DRAWINGS

The invention is outlined in more detail below based on an exemplary and non-limiting embodiment, which is illustrated in the figures. In the figures

DETAILED DESCRIPTION OF EMBODIMENTS OF THE INVENTION

In the following figures, unless otherwise stated, the same reference numbers denote the same features.

Figure 1A:
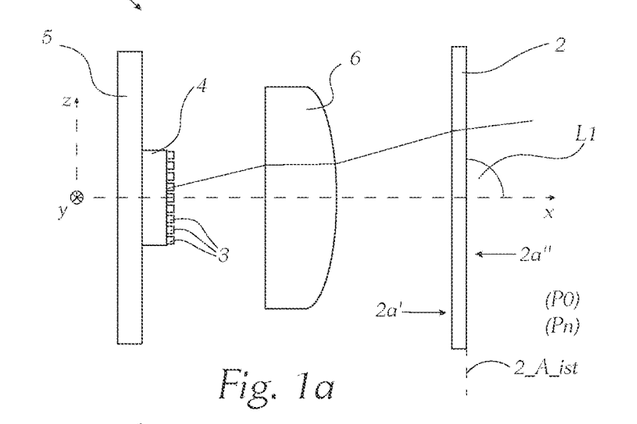
FIG. 1a shows a side view of a schematic illustration of a light module for use in conjunction with the present invention.

FIG. 1a shows a side view of a schematic illustration of a light module 1 for use in conjunction with the present invention. The light module 1 is designed to emit segmented light distribution. For this purpose, it comprises a light source 4, which comprises, for example, a matrix of individually controllable LEDs, wherein each LED is associated with a segment of light distribution that can be emitted and forms a light pixel 3 of the light distribution. Other light sources of light sources systems suitable for producing segmented light distribution can of course also be used. The light source is typically arranged on a circuit carrier 5, in particular on a PCB. The light emitted by the light source 4 can, for example, pass through an optical component 6, for example an expansion optical system, before it then enters a deflection unit 2. A native resolution is typically defined by the number of individually controllable light areas of the light source 4. If the light source 4 has, for example, 100 individually controllable LEDS arranged in a matrix of 10 columns and 10 rows, this results in 100 segments or a native resolution of 10×10. The deflection unit 2 is designed to deflect light rays LI emitted by the light source 4. For this purpose, it can be provided that the deflection unit 2 comprises a glass plate 2a, which is pivotable or displaceable about at least one axis. More detailed information on this will be discussed below in connection with FIGS. 2a to 2c.

Figure 1B:
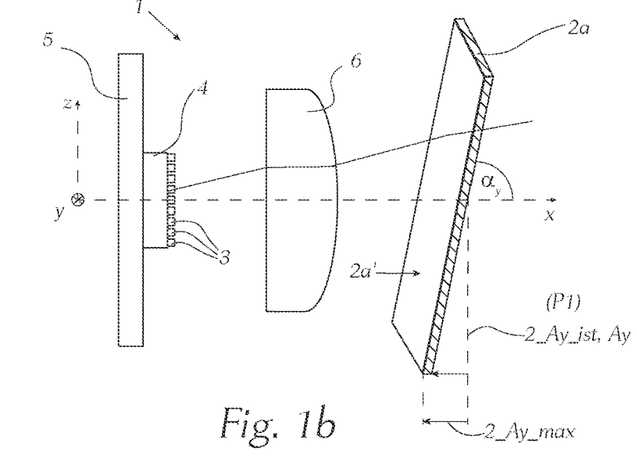
FIG. 1b shows the side view according to FIG. 1a with a tilted deflection unit.
Figure 1C:
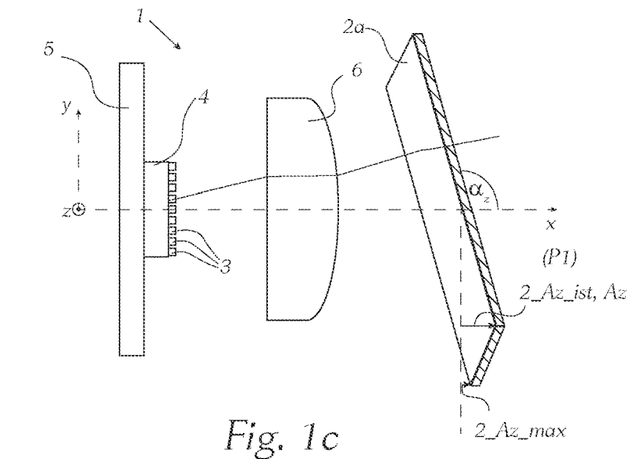
FIG. 1c shows a plan view of the light module in the position according to FIG. 1b.

FIG. 1a to 1c show that the beam is deflected by the deflection unit 2, e.g. by refraction of the light as it enters and leaves the deflection unit 2. More specifically, the light is refracted at a light entry surface 2a' and at a light-emitting surface 2a" of the glass plate 2a. As a result, the outgoing light is offset from the light path of the incoming light. The light ray LI is thus deflected. This deflection is used in the present invention to visually increase a native resolution of the light module 1 by at least temporary beam deflection by means of the deflection unit 2. This is achieved by time-variable deflection by means of the deflection unit 2, typically at a speed that is high enough for the human eye to perceive light distributions emitted one after the other, which differ at least through different positions of the deflection unit 2 in terms of the position of the individual segments, as a common light distribution with correspondingly higher perceptible resolution. The frequency is preferably at least 60 Hz.

For a better overview, a Cartesian coordinate system was used in some figures, which was chosen such that the x-axis coincides with a main emission direction (in the case of a vehicle headlight, typically the forwards direction of travel of a vehicle), the y-axis is orthogonal thereto and horizontally oriented, and the z-axis is vertically oriented and thus oriented at right angles to the plane spanned by the x- and y-axes. In the exemplary embodiment shown here according to FIG. 1a to FIG. 1c, the glass plate 2a can be pivoted about two axes, namely about the y-axis (see FIG. 1b) and about the z-axis (see FIG. 1c).

FIG. 1a shows the glass plate 1a in a non-deflected reference state P0, which coincides with a neutral position Pn in the present example. However, these two positions can also differ from one another. The deflection unit 2 can thus have a neutral position Pn, which the deflection unit 2 automatically assumes in the event of a failure of a power supply to the deflection unit 2 or of a control variable 2_s provided for controlling the deflection unit 2. An amplitude 2_A_ist of the deflection is equal to zero in the position according to FIG. 1a.

As already mentioned, it can be provided that the light distribution is segmented by individually controllable light pixels 3. These are preferably arranged next to each other in a matrix with a native resolution of at least two rows and two columns, substantially without gaps. A maximum amplitude 2_Ay_max (see FIG. 1b) and/or 2_Az_max (see FIG. 1c) of the deflection is selected such that compared to a non-deflected reference state P0, the deflected state P1 has a vertical and a horizontal offset of half a pixel width such that when the maximum amplitude of the deflection is reached—with the exception of edge pixels—each deflected light pixel 3 (as seen after passing through the deflection unit 2) spatially overlaps four non-deflected light pixels by 25% each.

Figure 4:
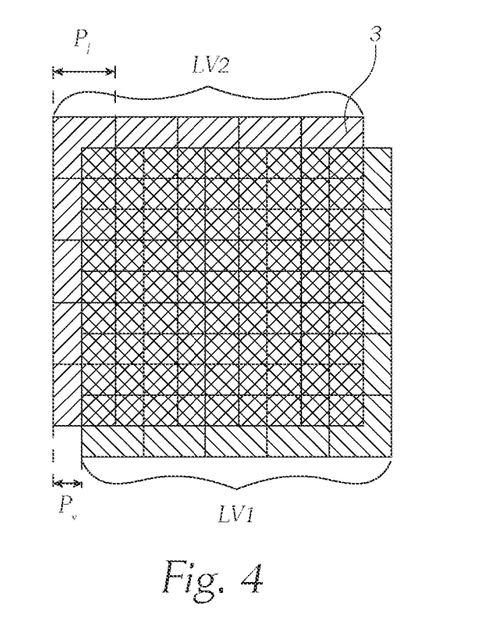
FIG. 4 shows an illustration of two light distributions, which can be emitted one after the other by means of a light module according to the invention.

FIG. 1b shows the side view according to FIG. 1a with a tilted deflection unit 2. The deflection unit 2 or glass plate 2a has been pivoted about the y-axis by the angle $\square_y$, which results in the amplitude of the deflection 2_Ay_ist. The value of 2_Ay_ist is slightly smaller than the maximum deflection in this direction, namely 2_Ay_max, such that the maximum increase in the perceptible resolution does not occur yet, as can be seen in FIG. 4. The displacement $P_v$ of a pixel 3 of a downstream image or a downstream segmented light emission is less than half the side length $P_1$ of a pixel 3. Only when the displacement $P_v$ (both upwards and sideways) of the light pixels 3 is half the side length $P_1$ of a pixel 3 is the maximum increase in perceptible resolution achieved.

FIG. 1c shows a plan view of the light module 1 in the position according to FIG. 1b. The glass plate 2a has been pivoted about the z-axis by the angle $\square_z$, which results in the amplitude of the deflection 2_Az_ist. The value of 2_Az_ist is slightly smaller than the maximum deflection in this direction, namely 2_Az_max, such that here too the maximum increase in the perceptible resolution does not occur yet.

Figure 2A:
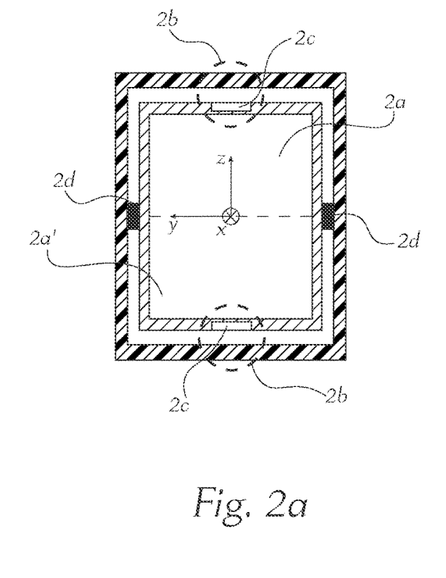
FIG. 2a shows a schematic illustration of a first embodiment of a deflection unit.

FIG. 2a shows a schematic illustration of a first embodiment of a deflection unit 2. The deflection unit 2 comprises the aforementioned glass plate 2a as well as two mechanical restoring elements 2d, in particular spring elements 2b in the form of torsion springs, which are arranged along the y-axis and thus enable the glass plate 2a to swing around the y-axis. Two electrical coils 2a, which form part of the deflection unit 2, are arranged normal to the y-axis and along the z-axis. The coils 2b can be energized and are designed to exert a magnetic force on a corresponding means 2c for magnetic coupling, for example a magnet, arranged on the glass plate.

In other words, it can be said that the glass plate 2a has a flat light entry surface 2a' and a light-emitting surface 2a" plane-parallel thereto (see FIG. 1a), wherein the deflection unit 2 has at least one electrical coil 2b for each axis about which the glass plate 2a can be pivoted, wherein a means 2c for magnetic coupling to the respective coil 2b is arranged on the glass plate 2a for each coil 2b such that a force can be exerted on the associated means 2c by energizing the respective coil 2b in such a way that the glass plate 2a is pivoted, in particular rotated, about the respective axis as a function of the energizing of the coil 2b. For each axis about which the glass plate 2a can be pivoted, a mechanical restoring element 2d is provided, in particular a spring element, for restoring the glass plate 2a to a neutral position Pn, which the glass plate 2a automatically assumes in the event of a failure of a power supply to the deflection unit 2 or of a control variable 2_s provided for controlling the deflection unit 2 (see FIG. 5). In addition or alternatively to this type of electromechanical force transmission, suitably coupled piezo actuators can also be used.

Figure 2B:
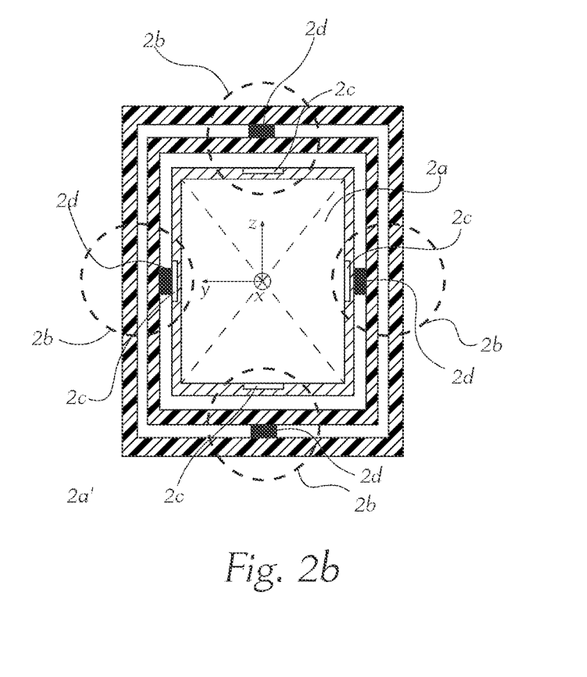
FIG. 2b shows a schematic illustration of a second embodiment of a deflection unit.

FIG. 2b shows a schematic illustration of a second embodiment of a deflection unit 2. In contrast to FIG. 2, the glass plate 2a here can be pivoted about two axes, namely the y- and z-axes. Restoring elements 2d are also arranged here along the pivot axes. Coils 2b and coupling means 2 are respectively arranged in-between. This embodiment involves pivoting with two degrees of freedom, i.e. the deflection about the y-axis is independent of the deflection about the z-axis and vice versa. As a result, diagonal deflections can also be achieved through deflection about both axes.

Figure 2C:
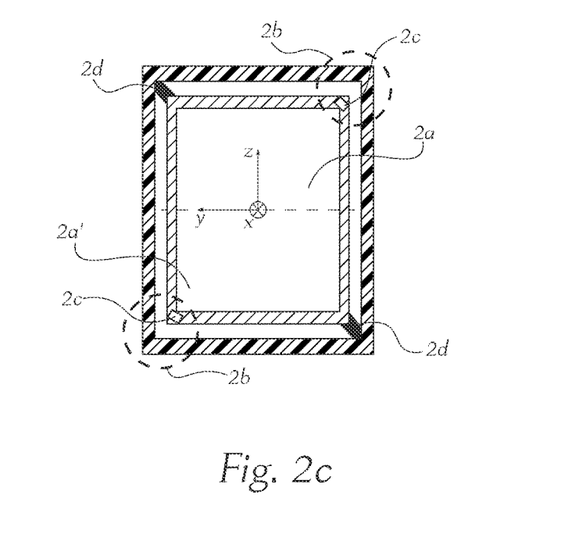
FIG. 2c shows a schematic illustration of a third embodiment of a deflection unit.

FIG. 2c shows a schematic illustration of a third embodiment of a deflection unit 2. Here, the glass plate 2a is suspended in such a way that a deflection is already diagonal to the y- and z-axes. This means that the deflection axis is transverse to these two y- and z-axes. Despite the fact that the number of degrees of freedom of the deflection is only one in this case, this choice of deflection axis enables a deflection that increases the visually perceptible resolution by a factor of four compared to the native resolution.

Figure 3:
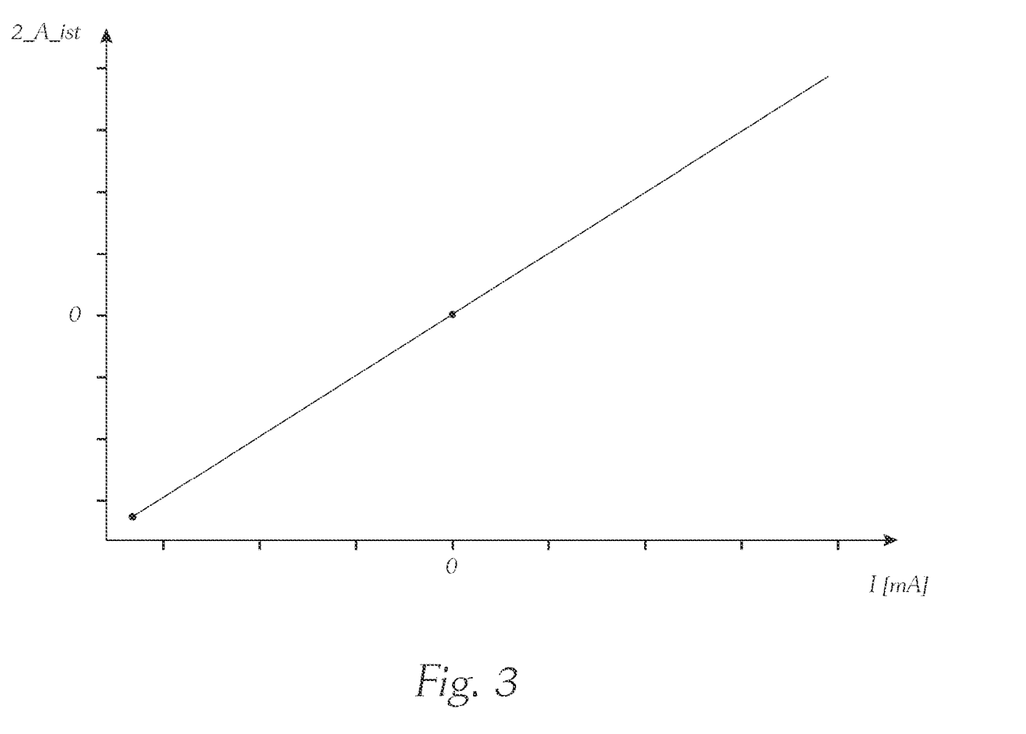
FIG. 3 shows a graph displaying the static relationship between coil current and deflection of a typical deflection unit, as it can be used for the invention.

FIG. 3 shows a graph displaying the static relationship between coil current and deflection of a typical deflection unit 2, as it can be used for the invention. This shows a linear relationship between current and deflection for the static case. The deflection 2_A_ist is proportional to the current I fed into the coils 2b. In dynamic operation, the mass inertia of the glass plate 2a, any inertia of the restoring elements 2d, inductive effects of the coils 2d etc. are, of course, taken into account. A person skilled in the art is able to utilize corresponding control algorithms to control the coils 2b in order to achieve the desired positions of the glass plate 2a of the deflection element 2 at any time.

FIG. 4 shows an illustration of two light distributions LV1 and LV2, which can be emitted one after the other by means of a light module 1 according to the invention. The light distributions respectively comprise 5×5 pixels, which, arranged above and next to one another, together form a square. The square associated with the second light distribution LV2 is offset by approximately less than half a pixel length $P_1$ with respect to the square associated with the first light distribution LV1 both in a horizontal and vertical direction. It can be seen that the light pixels overlap one another and in the region where the squares overlap, the impression is created that the number of light pixels has now been increased fourfold as every light pixel is split into four different overlapping regions. The immediately consecutive emission of the light distribution LV1 and LV2 therefore creates a visual impression of a perceptible resolution that is significantly increased compared to the native resolution (in this case 5×5). The impression of increased perceptible resolution is at its maximum when the offset of the light pixels is ½ a pixel length $P_1$.

Figure 5:
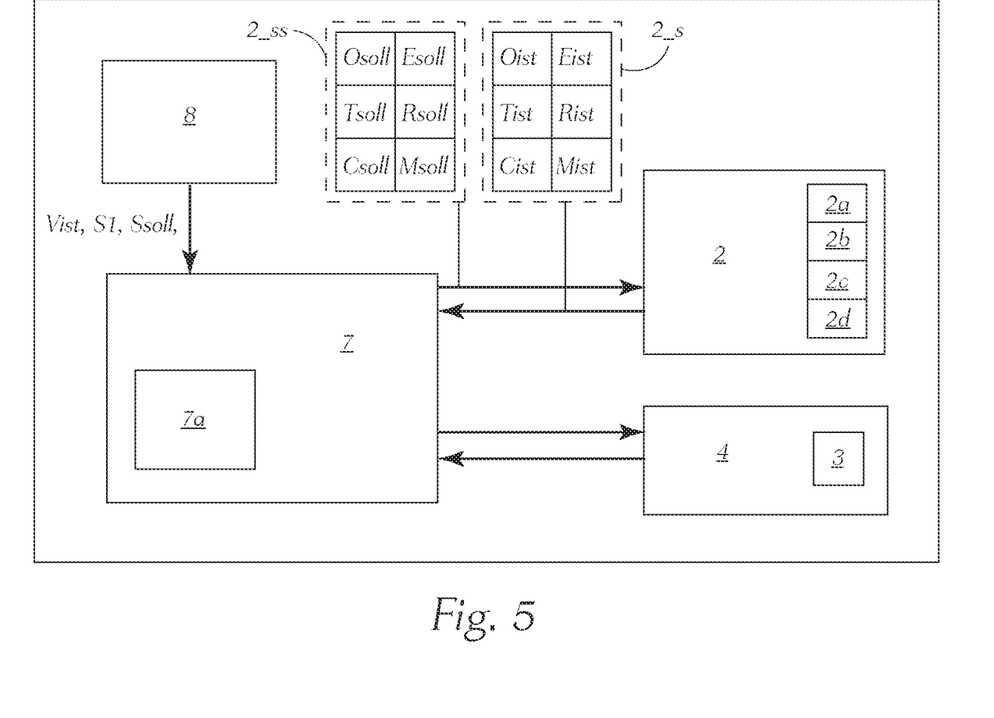
FIG. 5 shows a block diagram relating to individual possible components of the invention.

FIG. 5 shows a block diagram relating to individual possible components of the invention. It shows that the light pixels 3 are associated with the light source 4, which is controlled by a control unit 7. The control unit 7 comprises a calculation unit 7a, which, for example as a function of an incoming image signal S1, controls the light source 4 in such a way that those segments or light pixels 3 are controlled according to an image predetermined by the image signal S1, also referred to as setpoint image Ssoll, such that the image predetermined by the image signal S1 is reproduced as faithfully as possible. In particular in those cases where the predetermined image has a resolution that exceeds the native resolution of the light module 1, a visual impression that is as similar as possible to the predetermined setpoint image Ssoll can be created by superimposing the different light distributions by means of targeted calculation of different light distributions LV1 and LV2 as well as adaptation/calculation of the deflection positions associated with the respective light distributions, e.g. Pn, P0, P1. The image signal S1 can be fed to the control unit 7 via a data source 8.

There are certain degrees of freedom when controlling the deflection unit 2. In principle, an increased frequency of the deflection of the glass plate 2a and a greater amplitude of the deflection is associated with increased energy consumption and wear of the electromechanical components involved. Depending on how precisely the setpoint image Ssoll is to be reproduced and also whether any further functions such as blurring are to be applied to the setpoint image Ssoll, it is possible to specifically intervene in the calculation of the deflection by means of the deflection unit 2, as will be explained in more detail in relation to FIGS. 6 to 8. For this purpose, the control unit 7 is supplied with a setpoint operating signal 2_ss, which provides information about how precisely the setpoint image Ssoll is to be reproduced, whether other boundary conditions such as specifications for setpoint energy efficiency Esoll, setpoint temperature Tsoll, setpoint image resolution Rsoll, setpoint image sharpness Csoll, setpoint clarity Msoll, and/or offset correction Osoll are to be taken into account, and if they are, with what hierarchical weighting individual specification are to be taken into account.

The invention relates to a method for operation-optimized control of a deflection unit 2 for a light module 1, wherein the light module 1 is designed to emit segmented light distribution, wherein the light module 1 comprises the deflection unit 2, with which a native resolution of the light module can be visually increased by at least temporary beam deflection by means of the deflection unit 2, wherein the method comprises the following steps:

a) receiving a setpoint operating signal 2_ss, wherein the setpoint operating signal 2_ss contains information on at least one of the following criteria: setpoint energy efficiency Esoll; setpoint temperature Tsoll; setpoint image resolution Rsoll; setpoint image sharpness Csoll; setpoint clarity Msoll; offset correction Osoll; and b) manipulating a control variable 2_s of the deflection unit 2 depending on the setpoint operating signal, wherein the extent and temporal process of the deflection by the deflection unit 2 occurs depending on the control variable 2_s, wherein for this purpose at least two of the following aspects of the deflection, predetermined by the control variable 2_s, are manipulated in amount and/or time period: amplitude 2_A_ist; zero position 2_0_ist; temporal rate of change 2_dt_ist; signal basic form 2_F_ist; time period between the zero position passes 2_tp_ist.

Figure 6:
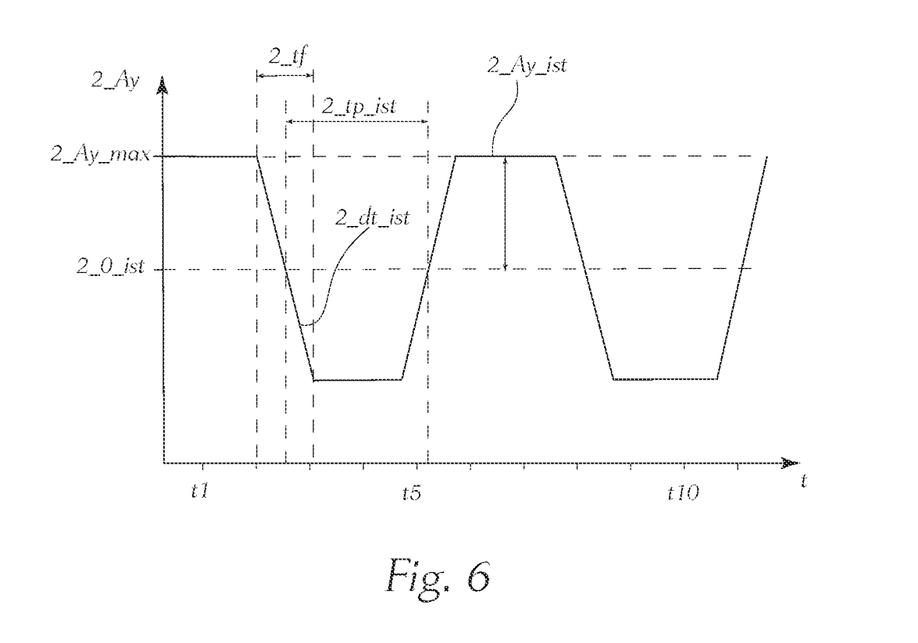
FIG. 6 shows an illustration of a first time course of deflections of a deflection unit, which can be used in the present invention.

FIG. 6 shows an illustration of a first time course of deflections of a deflection unit 2. More specifically, it shows (as do FIGS. 7 and 8) the time course of the deflection 2_Ay_ist whilst the glass plate 2a rotates about the y-axis. All of the above for the deflection about the y-axis can of course be applied in a similar way in the case of a sole or additional deflection about the z-axis.

Figure 7:
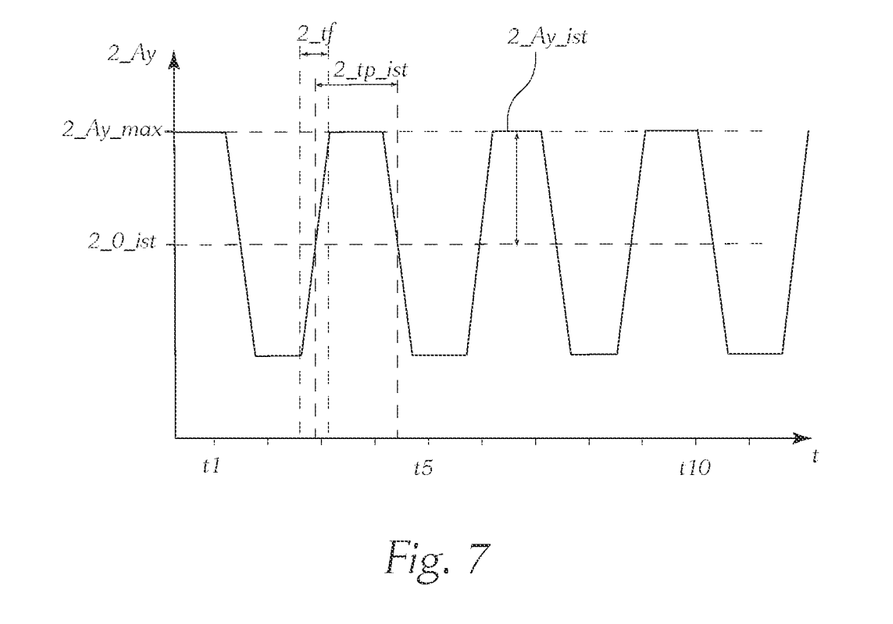
FIG. 7 shows an illustration of a second time course of deflections of a deflection unit, which can be used in the present invention.
Figure 8:
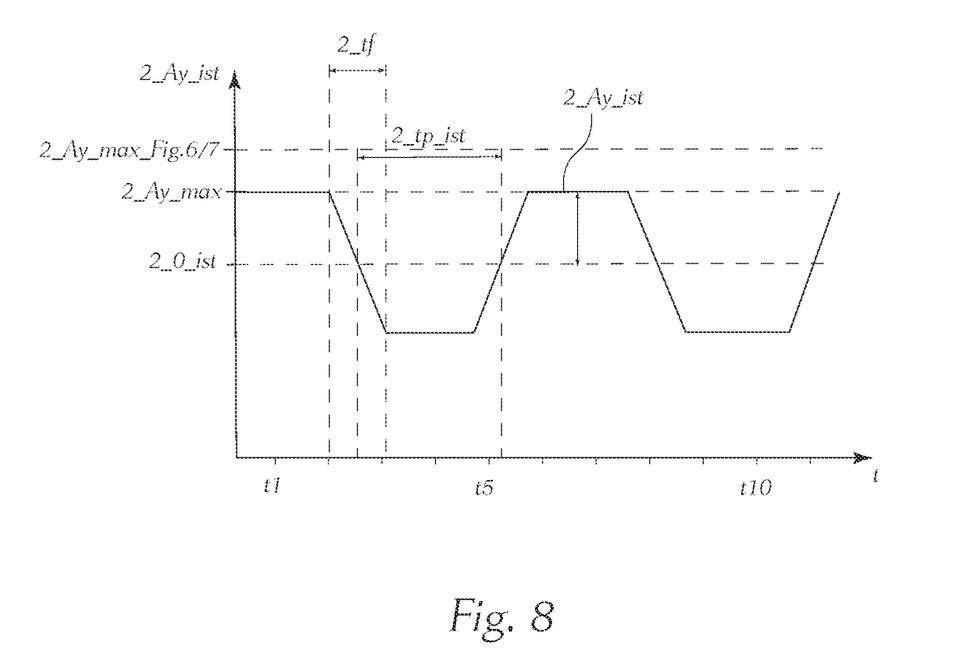
FIG. 8 shows an illustration of a second time course of deflections of a deflection unit, which can be used in the present invention.

The rotation can, for example, be a few tenths of a degree to a few degrees. The deflection or the amplitude of the deflection can, for example, assume a maximum value 2_Ay_max, as shown in FIGS. 6 and 7. In contrast, in FIG. 8, this maximum value 2_Ay_max of the deflection is reduced, as can be seen by comparing it to the value 2_Ay_max_FIGS. 6/7 also shown in FIG. 8.

In particular, it can be provided that in to achieve a setpoint energy efficiency Esoll derived from the setpoint operating signal 2_ss according to step a), the time period 2_tp_ist between the zero passes is manipulated in such a way that in any case where an actual energy efficiency Eist of the deflection unit 2 falls below the setpoint energy efficiency Esoll, the time period between the zero position passes 2_tp_ist is increased. The higher the frequency with which the deflection unit is controlled, the higher the energy consumption and the lower the energy efficiency. Reducing the frequency makes it possible to operate the light module 1 more economically, which again helps save energy and increase the service life of the actuator and the coils 2b. The setpoint energy efficiency Esoll can be predetermined in such a way that it is determined as a function of a detected driving speed Vist of a vehicle comprising the light module 1 together with the deflection unit 2 such that the required setpoint energy efficiency increases as the driving speed decreases. FIG. 7 shows a variant in which the time period 2_tp_ist between the zero position passes has been reduced compared to FIG. 6. Specifically, both the frequency of the deflection and the edge steepness between the deflection positions 2_Ay_max or −2Ay_max to be reached have been increased. An edge time period 2_tf has therefore also been reduced in FIG. 7 compared to FIG. 6. The emission of light by the light sources 4 can thus be timed such that this only occurs in the time period between the edges, i.e. outside of 2_tf. In this way, for example, the sharpness of the image can be further increased, as blurring of the emission is avoided.

It can further be provided that in order to achieve a setpoint temperature Tsoll derived from the setpoint operating signal 2_ss according to step a), the time period tp between the zero passes is manipulated in such a way that in any case where an actual temperature Tist of the deflection unit 2 or of the light module 1 exceeds a setpoint temperature Tsoll, the time period 2_tp_ist between the zero position passes is increased.

It can further be provided that in order to achieve a setpoint image sharpness derived from the setpoint operating signal 2_ss according to step a), the amplitude 2_A_ist of the deflection is manipulated in such a way that a maximum amplitude 2_A_max is predetermined when maximum image sharpness is predetermined, and the amplitude 2_A_ist is reduced as the setpoint image sharpness decreases.

In addition, it can be provided that in order to achieve a setpoint image resolution Rsoll derived from the setpoint operating signal 2_ss according to step a, the amplitude 2_A_ist of the deflection is manipulated in such a way that a maximum amplitude 2_A_max is predetermined when maximum setpoint image resolution is predetermined, and the amplitude 2_A_ist is reduced as the setpoint image resolution decreases.

It can further be provided that in order to achieve a setpoint energy efficiency Esoll derived from the setpoint operating signal 2_ss according to step a, the amplitude 2_A_ist of the deflection is manipulated in such a way that in any case where an actual energy efficiency Eist of the deflection unit 2 falls below the setpoint energy efficiency, the amplitude 2_A_ist of the deflection is reduced.

In particular, it can be provided that in order to achieve an offset correction derived from the setpoint operating signal 2_ss according to step a, the zero position 2_0_ist of the deflection is manipulated.

It can further be provided that in order to achieve a setpoint image sharpness Csoll derived from the setpoint operating signal 2_ss according to step a, the temporal rate of change 2_dt_ist of the deflection is manipulated in such a way that in any case where an actual image sharpness Cist of the deflection unit 2 falls below the setpoint image sharpness Csoll, the temporal rate of change 2_dt_ist of the deflection is increased. This increase in the temporal rate of change can only affect the time period of the edges $2\_tf$, for example. The end positions $2\_Ay\_max$ can thus be held for longer at a constant frequency due to a steeper edge. The implementation of steeper edges is usually associated with greater electromechanical requirements or stresses on the deflection unit 2. In other words, this aspect does not therefore necessarily mean an increase in frequency; rather, steeper edges can simply be provided between two end positions. The faster the actuator is moved to the desired positions, the sharper the image becomes; the slower the desired position is reached, the more the transitions between the first frame and the second frame are "mixed" together.

In particular, it can be provided that in order to achieve a setpoint clarity M_soll of the deflection unit 2 derived from the setpoint operating signal $2\_ss$ according to step a, the temporal rate of change $2\_dt\_ist$ of the deflection is manipulated in such a way that if a setpoint clarity M_soll is undershot, the temporal rate of change $2\_dt\_ist$ of the deflection is at least temporarily increased.

The invention further relates to a light module 1 for a motor vehicle light, wherein the light module 1 is designed to emit segmented light distribution, wherein the light module 1 comprises a deflection unit 2, with which a native resolution of the light module 1 can be visually increased by at least temporary beam deflection by means of the deflection unit 2, wherein the light module 1 is designed to implement the method according to the invention. Of course, the light module 1 can comprise components such as the aforementioned control unit 7, the light source 4, the optical element 6, any projection optics etc.

The invention is not limited to the embodiments shown, but is defined by the entire scope of protection of the claims. Individual aspects of the invention or embodiments may also be adopted and combined with each other. Any reference numbers in the claims are exemplary and merely serve to make the claims easier to read, without limiting them.

The invention claimed is:

1. A method for operation-optimized control of a deflection unit (2) for a light module (1), wherein the light module (1) is designed to emit segmented light distribution, wherein the light module (1) comprises the deflection unit (2), with which a native resolution of the light module (1) can be visually increased by at least temporary beam deflection by means of the deflection unit (2), the method comprising:
   a) receiving a setpoint operating signal ($2\_ss$), wherein the setpoint operating signal ($2\_ss$) contains information on at least one of the following criteria: setpoint energy efficiency (Esoll); setpoint temperature (Tsoll); setpoint image resolution (Rsoll); setpoint image sharpness (Csoll); setpoint clarity (Msoll); offset correction (Osoll); and
   b) manipulating a control variable ($2\_s$) of the deflection unit (2) depending on the setpoint operating signal, wherein the extent and temporal process of the deflection by the deflection unit (2) occurs depending on the control variable ($2\_s$), wherein for this purpose at least two of the following aspects of the deflection, predetermined by the control variable ($2\_s$), are manipulated in amount and/or time period: amplitude ($2\_A\_ist$); zero position ($2\_0\_ist$); temporal rate of change ($2\_dt\_ist$); time period between the zero position passes ($2\_tp\_ist$)).

2. The method according to claim 1, wherein in order to achieve a setpoint energy efficiency (Esoll) derived from the setpoint operating signal ($2\_ss$) according to step a), the time period ($2\_tp\_ist$) between the zero passes is manipulated in such a way that in any case where an actual energy efficiency (Eist) of the deflection unit (2) falls below the setpoint energy efficiency (Esoll), the time period between the zero position passes ($2\_tp\_ist$) is increased.

3. The method according to claim 2, wherein the setpoint energy efficiency (Esoll) is predetermined in such a way that it is determined as a function of a detected driving speed (Vist) of a vehicle comprising the light module (1) together with the deflection unit (2) such that the required setpoint energy efficiency increases as the driving speed decreases.

4. The method according to claim 1, wherein in order to achieve a setpoint temperature (Tsoll) derived from the setpoint operating signal ($2\_ss$) according to step a), the time period ($2\_tp\_ist$) between the zero passes is manipulated in such a way that in any case where an actual temperature (Tist) of the deflection unit (2) or of the light module (1) exceeds a setpoint temperature (Tsoll), the time period ($2\_tp\_ist$) between the zero position passes is increased.

5. The method according to claim 1, wherein in order to achieve a setpoint image sharpness (Csoll) derived from the setpoint operating signal ($2\_ss$) according to step a), the amplitude ($2\_A\_ist$) of the deflection is manipulated in such a way that a maximum amplitude ($2\_Ay\_max$, $2\_Az\_max$) is predetermined when maximum image sharpness is predetermined, and the amplitude ($2\_A\_ist$) is reduced as the setpoint image sharpness decreases.

6. The method according to claim 5, wherein the light distribution is segmented by individually controllable light pixels (3), which are arranged next to each other in a matrix with a resolution of at least two rows and two columns, substantially without gaps, wherein the maximum amplitude of the deflection is selected such that compared to a non-deflected reference state (P0), the deflected state (P1) has a vertical and a horizontal offset of half a pixel width such that when the maximum amplitude of the deflection is reached—with the exception of edge pixels—each deflected light pixel (3) spatially overlaps four non-deflected light pixels by 25% each.

7. The method according to claim 1, wherein in order to achieve a setpoint image resolution (Rsoll) derived from the setpoint operating signal ($2\_ss$) according to step a), the amplitude ($2\_A\_ist$) of the deflection is manipulated in such a way that a maximum amplitude ($2\_A\_max$) is predetermined when maximum setpoint image resolution is predetermined, and the amplitude ($2\_A\_ist$) is reduced as the setpoint image resolution decreases.

8. The method according to claim 1, wherein the deflection unit (2) has a neutral position (Pn), which the deflection unit (2) automatically assumes in the event of a failure of a power supply to the deflection unit (2) or of a control variable ($2\_s$) provided for controlling the deflection unit (2).

9. The method according to claim 1, wherein in order to achieve a setpoint energy efficiency (Esoll) derived from the setpoint operating signal ($2\_ss$) according to step a), the amplitude ($2\_A\_ist$) of the deflection is manipulated in such a way that in any case where an actual energy efficiency (Eist) of the deflection unit (2) falls below the setpoint energy efficiency, the amplitude ($2\_A\_ist$) of the deflection is reduced.

10. The method according to claim 1, wherein in order to achieve an offset correction derived from the setpoint operating signal ($2\_ss$) according to step a), the zero position ($2\_0\_ist$) of the deflection is manipulated.

11. The method according to claim 1, wherein in order to achieve a setpoint image sharpness (Csoll) derived from the setpoint operating signal ($2\_ss$) according to step a), the temporal rate of change (2_dt_ist) of the deflection is manipulated in such a way that in any case where an actual image sharpness (Cist) of the deflection unit (2) falls below the setpoint image sharpness (Csoll), the temporal rate of change (2_dt_ist) of the deflection is increased.

12. The method according to claim 1, wherein in order to achieve a setpoint clarity (M_soll) of the deflection unit (2) derived from the setpoint operating signal (2_ss) according to step a), the temporal rate of change (2_dt) of the deflection is manipulated in such a way that if a setpoint clarity (M_soll) is undershot, the temporal rate of change (2_dt) of the deflection is at least temporarily increased.

13. The method according to claim 1, wherein the deflection unit (2) comprises a glass plate (2a), which is pivotable or displaceable about at least one, preferably exactly one axis (y) or exactly two axes (y, z).

14. The method according to claim 13, wherein the glass plate (2a) has a flat light entry surface (2a') and a light-emitting surface (2a") plane-parallel thereto, wherein the deflection unit (2) has at least one electrical coil (2b) for each axis about which the glass plate (2a) can be pivoted, wherein a means (2c) for magnetic coupling to the respective coil (2b) is arranged on the glass plate (2a) for each coil (2b) such that a force can be exerted on the associated means (2c) by energizing the respective coil (2b) in such a way that the glass plate (2a) is pivoted about the respective axis (y, z) as a function of the energizing of the coil (2b).

15. The method according to claim 14, wherein for each axis (y, z) about which the glass plate (2a) can be pivoted, the deflection unit (2) also has a mechanical restoring element (2d), in particular a spring element, for restoring the glass plate (2a) to a neutral position (Pn), which the glass plate (2a) automatically assumes in the event of a failure of a power supply to the deflection unit (2) or of a control variable (2_s) provided for controlling the deflection unit (2).

16. A light module (1) for a motor vehicle light, wherein the light module (1) is designed to emit segmented light distribution, wherein the light module (1) comprises a deflection unit (2), with which a visually perceptible resolution of the light distribution produced by the light module (1) can be increased compared to the native light distribution of the light module (1), wherein the light module (1) is designed to implement the method according to claim 1.

* * * * *